United States Patent

Watts

[15] 3,676,952

[45] July 18, 1972

[54] LAWN EDGING DEVICE

[72] Inventor: Richard M. Watts, Henrico County, Va.

[73] Assignee: Reynolds Metals Company, Richmond, Va.

[22] Filed: Jan. 30, 1970

[21] Appl. No.: 7,057

[52] U.S. Cl. .................................... 47/33, 256/32, 94/31
[51] Int. Cl. ............................ E01c 11/22, A01g 1/08
[58] Field of Search ......................... 47/32–33; 256/32; 94/31

[56] References Cited

UNITED STATES PATENTS

| 235,611 | 12/1880 | Townsend | 94/31 X |
|---|---|---|---|
| 3,545,127 | 12/1970 | Jensen | 47/33 |
| 2,744,357 | 5/1956 | Foote | 47/33 |
| 1,139,515 | 5/1915 | Haas | 47/33 UX |
| 3,393,897 | 7/1968 | Wright | 256/32 |
| 606,151 | 6/1898 | Johnson | 47/33 |
| 1,916,494 | 7/1933 | Schrickel | 47/33 |
| 3,520,082 | 7/1970 | Smith | 47/33 |

Primary Examiner—Robert E. Bagwill
Attorney—Glenn, Palmer, Lyne, Gibbs & Thompson

[57] ABSTRACT

A dual-purpose lawn edging device which serves as a grass stop and a track for a lawn mower wheel. The device has a main strip and at least one side wall extending upwardly from one side edge of the strip with the side wall having a top ridge and an extension which extends downwardly from the ridge to define a supporting leg for the device which is adapted to be embedded in the ground to hold the device in position. The main strip is sufficiently wide to define the track and the side wall serves as a guide for the wheel while allowing easy crossing thereover.

7 Claims, 7 Drawing Figures

INVENTOR.
RICHARD M. WATTS

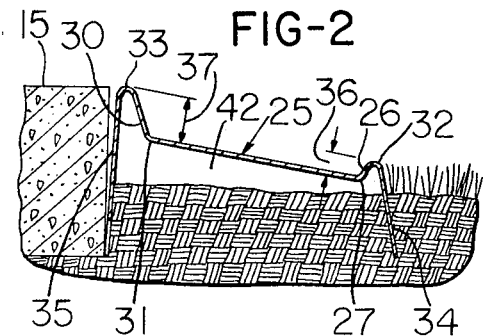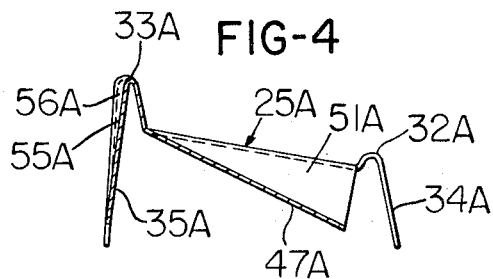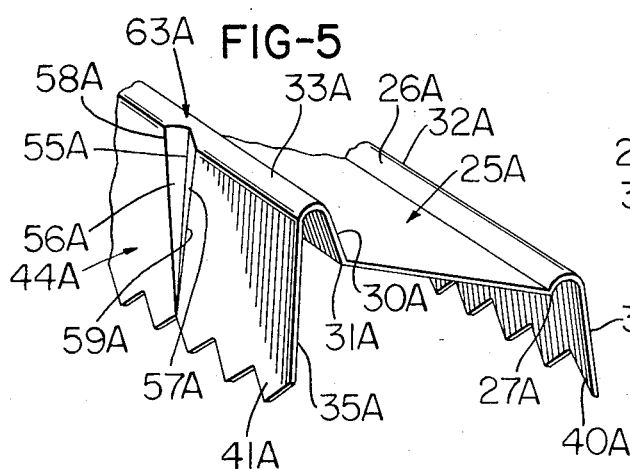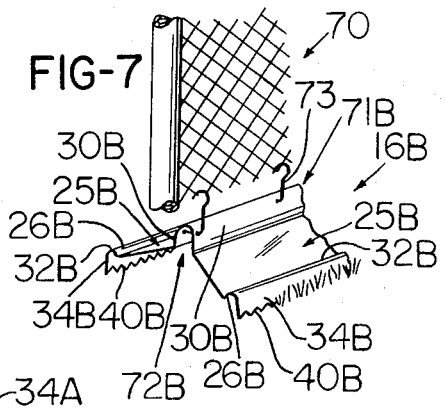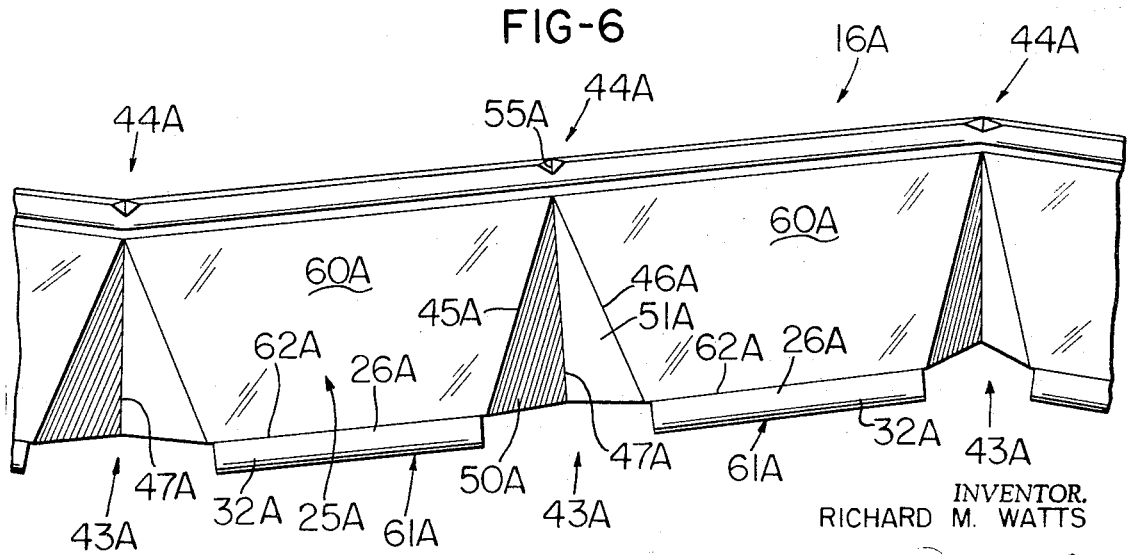

LAWN EDGING DEVICE

BACKGROUND OF THE INVENTION

Many lawn edging strips for stopping the growth of grass and/or weeds at locations adjoining a side walk, building, flower bed, etc. have been proposed previously. Some of these previously proposed edging strips include cutting blades for cutting grass making them very expensive and hence impractical to use while others of these strips are very simple and merely serve to cover an area of ground and shield such area from sunlight, whereby the vegetation thereunder dies. However, to provide a neat-looking lawn, it is necessary that the grass adjoining these simple strips be cut periodically and it has been found that this cutting may be more efficiently provided with a conventional lawn mower such as with a rotary lawn mower, for example.

In many applications, the edging strip is used along a sidewalk or building which may have loose pebbles or hard dirt particles thereon or such strip may adjoin an area which has decorative stones or hard objects comprising a mulch whereby for safety reasons it is desirable that the lawn mower be moved in a controlled path along the guide strip to prevent the lawn mower blade from propelling the stones or hard objects outwardly and injuring by-standers or damaging nearby articles. The edging strips proposed heretofore are not adequate in guiding a lawn mower to assure efficient cutting with optimum safety and do not provide satisfactory means for arranging the strip in a contoured path while still providing a sturdy supporting track for either one or a pair of aligned wheels of a lawn mover.

SUMMARY

This invention provides an improved dual-purpose lawn edging device which serves as a grass stop and a track for a lwan mower wheel and which may be made so that it can be arranged in an arcuate path. The device has a main strip and at least one side wall extending upwardly from one side edge of the strip with the side wall having a top ridge and an extension which extends downwardly from the ridge to define a supporting leg for the device which is adapted to be embedded in the ground to hold the device in position. The main strip is sufficiently wide to define said track and the side wall serves as a guide for the wheel yet enables comparatively easy crossing of the wheel thereover without damage thereto. In some applications of this invention, the device may be provided with another side wall extending upwardly from the opposite side edge of the main strip and the opposite side wall may be used as a stop to prevent easy crossing of the lawn mower wheel thereover.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 2 is a cross-sectional view taken on the line 2—2 of FIG. 1;

FIG. 4 is a view with parts in cross-section and parts in elevation taken on the line 4—4 of FIG. 3;

FIG. 5 is a fragmentary perspective view particularly illustrating a gusset provided in the rear portion of the straight section of the device of FIG. 2;

FIG. 6 is a plan view of a fragmentary portion of the lawn edging device illustrated in FIG. 3; and FIG. 7 is a perspective view with parts in cross-section and parts broken away illustrating another exemplary embodiment of a lawn edging device of this invention installed in position beneath an associated fence.

DESCRIPTION OF ILLUSTRATED EMBODIMENTS

Figure 1:
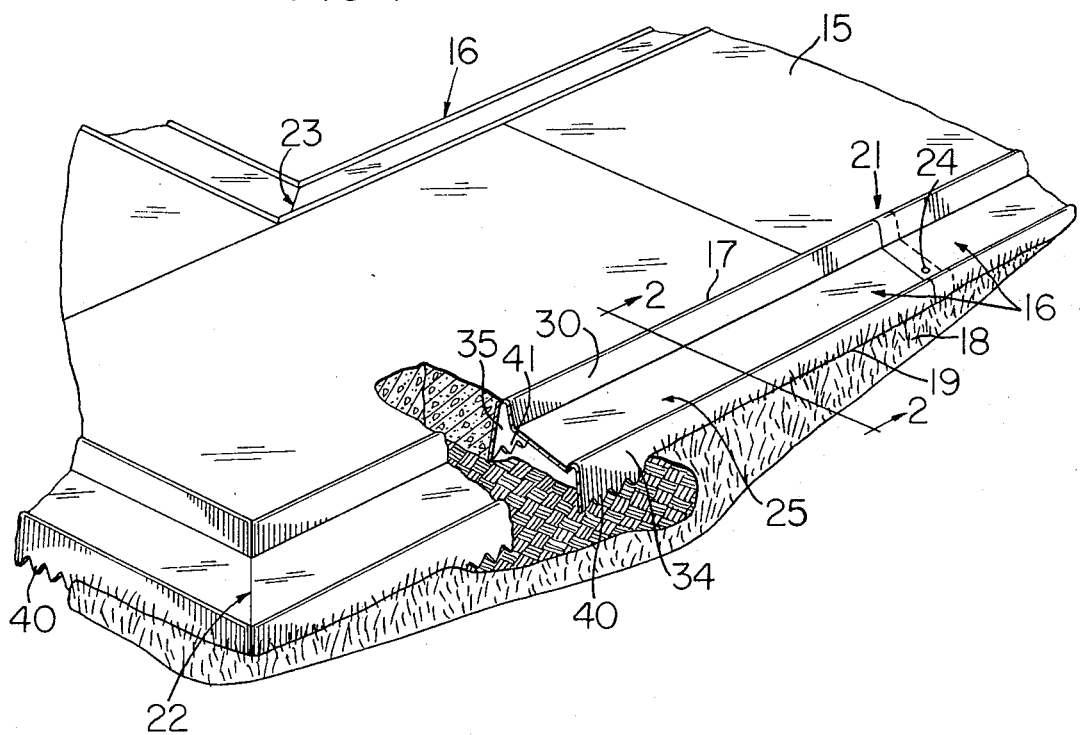
FIG. 1 is a perspective view with parts in cross-section and parts broken away illustrating one exemplary embodiment of the dual-purpose lawn-edging device of this invention installed in position along an associated sidewalk.

Reference is now made to FIG. 1 of the drawings, which illustrates a sidewalk 15 having a plurality of exemplary lawn edging devices 16 associated therewith. Each device 16 is a straight unit which has one side arranged adjoining the sidewalk as indicated at 17 and its opposite side firmly embedded in an adjoining lawn 18 as indicated at 19. Each device 16 is arranged in aligned end-to-end relation and preferably overlapped with an adjoining device as indicated at 21 along a straight section, mitered as shown at 22 to define an outside corner, and mitered as shown at 23 to define an inside corner, whereby a plurality of straight devices 16 may be utilized in association with a sidewalk having straight side edges and arranged around the entire peripheral edges thereof. The overlapped ends of the straight units or devices 16 shown at 21 may be fastened together by punching a nail 24 therethrough and driving the nail into the ground to provide a high strength junction; however, it will be appreciated that associated end edges may be placed in abutting relation, if desired.

The device 16 is in the form of a dual-purpose device and serves as a grass stop and a track for a conventional lawn mower, such as a rotary mower, for example. In particular, two aligned wheels of a rotary mower would usually roll on and be supported by the device 16 while the other two wheels would roll on the ground or lawn 18.

The device 16 comprises a central main strip 25, see FIGS. 1 and 2, a first side wall 26 extending upwardly from one side edge 27 of the strip 25, and a second side wall 30 extending upwardly from the opposite side edge 31 of the strip 25. Each side wall 26 and 30 has a top outwardly convex arcuate ridge 32 and 33 respectively, an extension 34 extending downwardly from ridge 32, and another extension 35 extending downwardly from ridge 33. The extensions 34 and 35 define supporting legs for the device 16 and such legs are adapted to be embedded in the ground to hold the device in position. The main strip 25 is sufficiently wide to define the previously mentioned track for the lawn mower wheels rolled thereon and has sufficient strength to enable rolling movement of each wheel thereover without deformation or bending of strip 25.

The side wall 26 with its extension 34 is arranged farthest away from the sidewalk 15 and has a given height as indicated at 36. The side wall 26 serves as a guide for each wheel of the lawn mower moving on strip 25 yet enables comparatively easy crossing of each wheel thereover. The upwardly convex arcuate ridge 32 which defines the top ridge of side wall 26 is of substantially semi-circular cross-section and serves to reinforce the side wall 26 and prevent damage thereto upon rolling a lawn mower wheel thereacross.

The side wall 30 has a height, indicated at 37, above the main strip 25 which is greater than the height indicated at 36 of the side wall 26. The greater height side wall 30 serves as a stop to prevent easy crossing of each wheel of the lawn mower thereover. Thus, the lawn mower is assured of not being moved across the sidewalk 15 (or, in other applications, over a portion of an area containing flowers or shrubs) whereby optimum safety is provided because it is impossible for the blade of a rotary mower to pick up and propel small objects outwardly. n addition, the grass adjoining the device 16 is neatly trimmed with optimum efficiency.

Each supporting leg or extension 34 or 35 has integral means extending therefrom for anchoring each of such legs to the ground. In particular, each supporting leg 34 and 35 has a saw-toothed projection 40 and 41 respectively defining the lower edge thereof and the saw-toothed projections 40 and 41 enable easy insertion of their associated supporting legs into the ground to thereby firmly anchor the device 15 in position.

In the presentation of FIG. 2 of the drawings, it will be seen that the volume beneath the main strip 25 is vacant as indicated at 42. However, the construction of the device 16 is such that the wheels of a lawn mower may be rolled over the main strip 25 without damage to the device 16. However, it will be appreciated that to provide optimum support beneath the main central strip 25, it would be a simple matter, during the installation of the device 16, to fill the space or volume 42 with dirt.

In many applications, it is desirable to provide lawn edging devices which may be easily arranged in a contoured manner, such as around a contoured sidewalk, building, flower bed, or the like; and, for this purpose another exemplary embodiment of the edging device of this invention is provided as illustrated in FIGS. 3–6 of the drawings.

The device illustrated in FIGS. 3–6 is very similar to the device 16; therefore, such device will be designated generally by the numeral 16A and parts of device 16A which are very similar to corresponding parts of device 16 will be designated by the same numeral as device 16, also followed by the letter designation "A" and not described again. Only those component parts which are substantially different from corresponding parts of device 16 will be designated by a new numeral also followed by the letter designation "A" and described in detail.

As seen particularly in FIG. 6 of the drawings, the device 16A has integral gusset means which enables such device to be formed in a contoured path which is substantially coplanar with the plane of the main strip 25A. In particular, the gusset means of device 16A comprises a plurality of roughly triangular gussets or webs 43A and 44A arranged along opposite sides thereof. Each gusset 43A has opposite edges 45A and 46A foldably connected to associated portions of the main strip 25A and has a fold line 47A which is arranged therein between its opposite edges 45A and 46A. In this example, the fold line 47A bisects its associated triangular gusset 43A.

Figure 3:
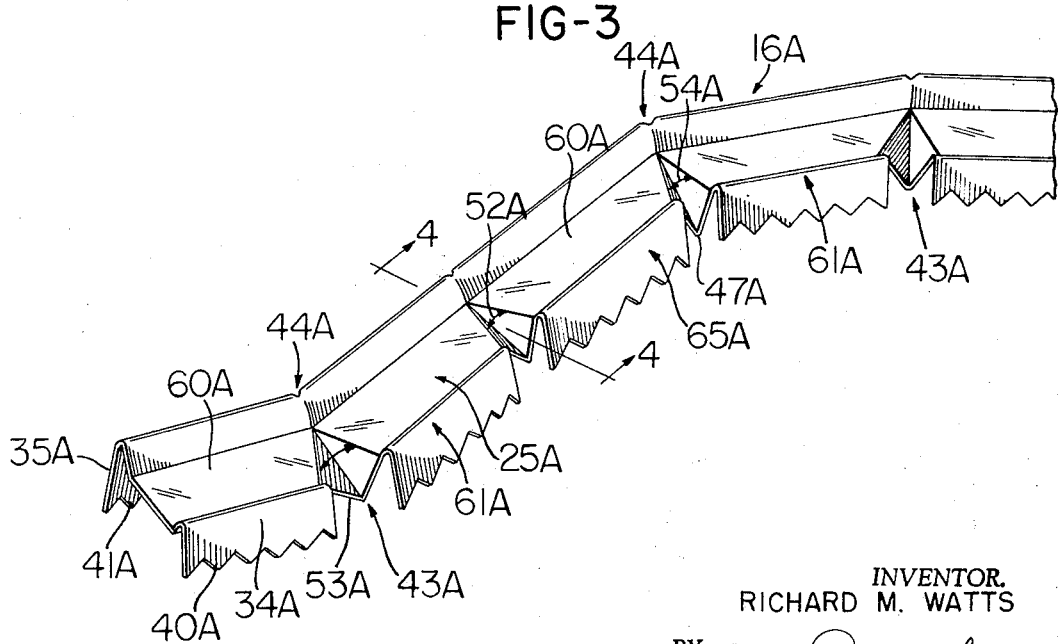
FIG. 3 is a perspective view illustrating another exemplary embodiment of the lawn edging device of this invention which is particularly adapted too be installed in position along a sidewalk, building, flower bed, or the like, having a contoured configuration.

The fold line 47A defines a pair of triangular planar sections 50A and 51A in the gusset 43A having an initial acute dihedral angle therebetween as indicated at 52A in FIG. 3, with adjacent sections of the device arranged in a rectilinear path. The angle at 52A becomes less acute, as indicated at 53A, upon bending the adjacent sections of device 16A and hence the main strip 25A in one direction and more acute as indicated at 54A upon bending the adjacent sections in an opposite direction.

The triangular gussets 44A provided in association with the extension or supporting leg 35A operate in a similar manner as the triangular gussets 43A. As best seen in FIG. 5, each triangular gusset 44A is divided, in two equal parts in this example, by a fold line 55A which defines a pair of planar triangular sections 56A and 57A. Sections 56A and 57A have their outer edges foldably connected along fold lines 58A and 59A respectively to the supporting leg or extension 35A.

Each triangular gusset 44A has an initial acute dihedral angle therebetween with the device 16A arranged in a rectilinear path. The dihedral angle becomes less acute upon bending adjacent sections of the device 16A in one direction essentially in the plane of its strip 25A and more acute upon bending such adjacent sections in an opposite direction in such plane whereby the triangular web 44A performs a similar function as the web 43A previously described.

As will be apparent from FIGS. 3 and 6 of the drawings, the main strip 25A is comprised of a plurality of spaced trapezoidal sections 60A provided with a triangular gusset 43A foldably connected between each immediately adjacent pair of trapezoidal sections 60A. The side wall 26A of the device 16A is comprised of a plurality of spaced portions as indicated at 61A with each portion extending upwardly from the shorter side 62A of the parallel sides of its associated trapezoidal section 60A and each portion of side wall 26A terminates in a corresponding portion of the top ridge 32A. Each side wall portion 26A also has a corresponding portion of the downward extension or supporting leg 34A extending beneath its top ridge 32A in the manner illustrated at 65A in FIG. 3 of the drawings.

Thus, it is seen that the device 16A may be easily bent or formed to follow practically any desired contour. Further, the main strip 25A is defined by alternating trapezoidal sections 60A and triangular sections 43A which cooperate to provide maximum structural strength for the device 16A and assure the provision of a continuous structure for supporting the wheels of a lawn mower.

In this example of the invention, integral gussets 44A are provided to assure that the supporting leg 35A may be formed in a contoured path; however, it will be appreciated that such forming or bending may also be provided by providing a cut-out in the extension 35A at each location where a triangular gusset 44A is now provided. In those applications where cut-outs are provided, the top edge of the cut-out could be arranged so that a portion of the arcuate ridge would remain uncut as shown at 63A in FIG. 5 whereby the wall 30A and arcuate ridge 33A would still have adequate strength. It will also be appreciated that the spacing between integral gussets 43A and 44A along each side of device 16A may be any desired amount which will be determined by the amount that it is desired to bend device 16A.

Another exemplary embodiment of this invention is illustrated in FIG. 7 of the drawings. The device of FIG. 7 is very similar to the device 16; therefore, such device will be designated generally by the reference numeral 16B and parts thereof which are very similar to corresponding parts of the device 16 will be designated by the same reference numeral as the device 16 also followed by the letter designation "B" and not described again. All of those component parts of the device 16B which are different from corresponding parts of the device 16 will be designated by a new numeral also followed by the letter designation B and described in detail.

The device 16B is used to prevent grass or weeds from growing immediately beneath a fence construction 70 and has component parts which enable the wheels of a lawn mower to be efficiently guided on opposite sides of the fence.

The main difference between the device 16B and the device 16 is that the device 16B is comprised of a pair of identical strips 25B arranged on opposite sides of a central ridge which is designated generally by the reference numeral 71B. The ridge 71B is outwardly convex and is defined by a pair of side walls 30B merging together.

Each strip 25B serves as a track for the wheels of a lawn mower in the manner previously described. In addition, the side walls 26B, ridges 32B and downward extensions 34B with their bottom saw-tooth projections 40B serve the same functions as corresponding parts of device 16 previously described.

The device 16B may have a plurality of sets of openings 72B provided therein with each set being defined by an opening in a side wall 30B arranged in aligned relation with a cooperating opening in the oppositely arranged side wall 30B. Each set of openings may be used to extend a fastener such as a wire 73 therethrough and then tie the wire to the lower portion of the fence 70.

The devices 16, 16A, and 16B may be made of any suitable metallic or non-metallic material. However, such devices are preferably made of a metallic material containing aluminum. These devices may also be suitably colored and/or provided with any desired surface texture or finish. In many applications, the devices 16, 16A, and 16B may be matched with the color and surface texture of downspouts, gutters, downspout drain troughs, etc.

Each device 16, 16A, and 16B is made using a sufficient amount of structural material to assure satisfactory performance after installation and need not be made so that its downwardly extending legs will withstand the high forces required to drive them into hard soil. The installation may be made by either suitably loosening the soil or thoroughly soaking the soil with water to facilitate easy installation.

Thus, it is seen that the lawn edging device of this invention may be utilized adjacent sidewalks, building constructions, fences, and may be installed in straight sections or contoured paths. In addition, the lawn edging device enables efficient cutting of a lawn adjoining such device while providing means for effortlessly controlling the motion of a lawn mower.

While present exemplary embodiments of this invention, and methods of practicing the same, have been illustrated and described, it will be recognized that this invention may be otherwise variously embodied and practiced within the scope of the following claims.

What is claimed is:

1. A dual-purpose lawn edging device serving as a grass stop and a track for a lawn mower wheel, said device comprising, a main strip, a side wall extending upwardly from one side edge of said strip, with said side wall having a top ridge, an extension which extends downwardly from said ridge to define a supporting leg for said device which is adapted to be embedded in the ground to hold said device in position, and integral gusset means provided in said strip enabling bending of said strip in an arcuate path which is substantially coplanar with the plane of said strip and enabling arranging said device in an arcuate path, said gusset means being free of openings thereby preventing grass from growing therethrough, said strip being sufficiently wide to define said track and said side wall serving as a guide for said lawn mower wheel yet enabling comparatively easy crossing of said wheel thereover.

2. A dual-purpose lawn edging device serving as a grass stop and a track for a lawn mower wheel, said device comprising, a main strip, a side wall extending upwardly from one side edge of said strip, with said side wall having a top ridge, an extension which extends downwardly from said ridge to define a supporting leg for said device which is adapted to be embedded in the ground to hold said device in position, and integral gusset means enabling bending of said strip in an arcuate path which is substantially coplanar with the plane of said strip to thereby enable arranging said device in an arcuate path, said gusset means comprising a plurality of roughly triangular gussets each having opposite side edges foldably connected to associated portions of said strip and having a fold line therein arranged between its opposite edges to define a pair of triangular planar sections having an initial dihedral angle therebetween when adjacent sections of said device are arranged in a rectilinear path, said angle becoming less acute upon bending said adjacent sections in one direction and more acute upon bending said adjacent sections in an opposite direction, said strip being sufficiently wide to define said track and said side wall serving as a guide for said lawn mower wheel yet enabling comparatively easy crossing of said wheel thereover.

3. A device as set forth in claim 2 in which said strip is comprised of a plurality of spaced trapezoidal sections provided with a triangular gusset foldably connected between each immediately adjacent pair of trapezoidal sections, said side wall is comprised of a plurality of spaced portions with each portion extending upwardly from the shorter of the parallel sides of its associated trapezoidal section and each side wall portion terminating in a corresponding portion of said top ridge and having a corresponding portion of said extension extending therebeneath.

4. A dual-purpose lawn edging device serving as a grass stop and a track for a lawn mower wheel, said device comprising, a main strip, a first and a second side wall extending upwardly from opposite side edges of said strip with each of said side walls having a top ridge, an extension which extends downwardly from each ridge to define a pair of supporting legs on opposite sides of said device which are adapted to be embedded in the ground to hold said device in position, and integral gusset means provided in said strip enabling bending of said strip in an arcuate path which is substantially coplanar with the plane of said strip and enabling arranging said device in an arcuate path, said gusset means being free of openings, said strip being sufficiently wide to define said track, said first side wall having a given height above said strip and serving as a guide for said lawn mower wheel yet enabling comparatively easy crossing of said wheel thereover, said second side wall having a height above said main strip which is greater than said given height and said second side wall serving as a stop to prevent easy crossing of said wheel thereover, whereby said device has a guide for said wheel along one side thereof and a stop for said wheel along its opposite side.

5. A dual-purpose lawn edging device serving as a grass stop and a track for a lawn mower wheel, said device comprising, a main strip, a first and a second side wall extending upwardly from opposite side edges of said strip with each of said side walls having a top ridge, an extension which extends downwardly from each ridge to define a pair of supporting legs on opposite sides of said device which are adapted to be embedded in the ground to hold said device in position, and integral gusset means enabling bending of said strip in an arcuate path which is substantially coplanar with the plane of said strip to thereby enable arranging said device in an arcuate path, said gusset means comprising a plurality of roughly triangular gussets each having opposite side edges foldably connected to associated portions of said strip and having a fold line therein arranged between its opposite edges to define a pair of triangular planar sections having an initial dihedral angle therebetween when adjacent sections of said device are arranged in a rectilinear path, said angle becoming less acute upon bending said adjacent sections in one direction and more acute upon bending said adjacent sections in an opposite direction, said strip being sufficiently wide to define said track, said first side wall having a given height above said strip and serving as a guide for said lawn mower wheel yet enabling comparatively easy crossing of said wheel thereover, said second side wall having a height above said main strip which is greater than said given height and said second side wall serving as a stop to prevent easy crossing of said wheel thereover, whereby said device has a guide for said wheel along one side thereof and a stop for said wheel along its opposite side.

6. A device as set forth in claim 5 in which said strip is comprised of a plurality of spaced trapezoidal sections provided with a triangular gusset foldably connected between each immediately adjacent pair of trapezoidal sections, said first side wall is comprised of a plurality of spaced portions with each portion extending upwardly from the shorter of the parallel sides of its associated trapezoidal section and each first side wall portion terminating in a corresponding portion of its associated top ridge and having a corresponding portion of its extension extending therebeneath.

7. A device as set forth in claim 6 in which each of said top ridges has an outwardly convex configuration of substantially semicircular cross-sectional configuration which serves to reinforce its associated side wall.

* * * * *